(12) United States Patent
Sundell et al.

(10) Patent No.: US 8,654,644 B2
(45) Date of Patent: Feb. 18, 2014

(54) OPTIMIZING COMMUNICATION TRAFFIC TRANSPORT

(75) Inventors: Hans-Olof Sundell, Kalvsund (SE); Andras Csaszar, Budapest (HU); Christian Gotare, Getinge (SE); Attila Mihaly, Dunakeszi (HU); Lars-Bertil Olsson, Angered (SE); Lasse Olsson, Stenungsund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 312 days.

(21) Appl. No.: 13/262,612

(22) PCT Filed: Apr. 8, 2009

(86) PCT No.: PCT/EP2009/054210
§ 371 (c)(1),
(2), (4) Date: Sep. 30, 2011

(87) PCT Pub. No.: WO2010/115459
PCT Pub. Date: Oct. 14, 2010

(65) Prior Publication Data
US 2012/0026884 A1 Feb. 2, 2012

(51) Int. Cl.
*G01R 31/08* (2006.01)
(52) U.S. Cl.
USPC .......................................... 370/235; 370/236
(58) Field of Classification Search
USPC .............. 370/230.1, 231, 232, 233, 235, 331, 370/332, 333, 334, 475
See application file for complete search history.

(56) References Cited

U.S. PATENT DOCUMENTS 6,954,785 B1 * 10/2005 Martin et al. ................. 709/223
2004/0141477 A1 * 7/2004 Xu et al. ....................... 370/328

FOREIGN PATENT DOCUMENTS

JP 2003 199135 A 7/2003
JP 2003199135 A * 7/2003 ............... H04Q 7/22

OTHER PUBLICATIONS

3GPP TS 23.401 V9.0.0 (Mar. 2009): "3rd Generation Partnership Project: Technical Specification Group Services and System Aspects: General Packet Radio Services (GPRS) Enhancements for Evolved Universal Terrestrial Radio Access Network (E-UTRAN) access (Release 8)" [Online], Mar. 2009, XP002562600 (2 pages).
International Search Report and Written Opinion for EP2009-054210, dated Jan. 1, 2010 (9 pages).

* cited by examiner

*Primary Examiner* — Hassan Phillips
*Assistant Examiner* — Siren Wei
(74) *Attorney, Agent, or Firm* — Rothwell, Figg, Ernst & Manbeck, P.C.

(57) ABSTRACT

The present invention relates to a solution for handling mobility and attachment of users in a wireless communication network (10). User equipment (1) is connected logically to an attachment node (14) at initial attachment and this attachment is determined from an analysis of stored historical mobility patterns of the user equipment. For instance, a mobility management device may be responsible for handling the attachment and for handling the determination of suitable attachment node, e.g. a gateway (5, 7, 8).

12 Claims, 4 Drawing Sheets

OPTIMIZING COMMUNICATION TRAFFIC TRANSPORT

CROSS REFERENCE TO RELATED APPLICATION(S)

This application is a 35 U.S.C. §371 National Phase Entry Application from PCT/EP2009/054210, filed Apr. 8, 2009, designating the United States, the disclosure of which is incorporated herein in its entirety by reference.

TECHNICAL FIELD

The present invention relates to solutions for minimizing traffic and signaling load in a wireless communication network and in particular for minimizing traffic and signaling load due to subscriber movement.

BACKGROUND

Demand for mobile and wireless communication is increasing as users get more and more used to communicating using wireless communication devices and as applications suitable for a mobile environment are developed. This increases the demand for available bandwidth in wireless communication networks.

Furthermore, as users increasingly use public transportation in order to reduce transportation costs and in view of environmental opinions, the opportunity to use wireless and mobile devices during transportation increases. For instance, many users talk to friends, family or business connections, check emails, check web pages such as news sites, receive streaming music, watch films or TV broadcasts using media applications in the mobile devices during travelling to and from a location, e.g. commuting to and from work.

In the situation with commuting, several different access devices may be connected along the geographical route and each switch between access devices may trigger a series of control signaling and data signaling over an infrastructure network supporting the access devices.

In the increasing demand for bandwidth, control and data signaling is preferably reduced.

The continuously increasing traffic output of subscribers means higher and higher transport costs for the operators. As a result operators are willing to invest more and more in new techniques that enable more efficient transport utilisation.

In the 3G/SAE architecture the GGSN or the PDN-GW (from now on referred to simply as "GW") is an anchor point for the mobile terminal. All traffic generated or received by the terminal has to pass through the GW, as the GW is the IP "point of presence" of the terminal for the external world.

If the gateway is far away from the mobile terminal, it requires considerable transport usage to get traffic to/from the terminal, especially in the frequent case when the terminal communicates with geographically close partners. This waste of transport resources is called a tromboning effect. By putting a local GW close to a group of base stations it is possible to eliminate unnecessary traffic tromboning for static subscribers. With such a solution, not only transmission cost may be spared but transit peering costs as well due to potential local peering options.

Unfortunately, such distribution of GWs may result in very long transport paths for subscribers that move away from the place of their initial attachment. Such users may be travelling businessmen or simple commuters.

State of the art mainly includes the existing mechanisms in 3GPP to select GWs when a subscriber attaches to the network. The DNS-based procedure is standardised for 3G networks while it is under standardisation for SAE (R8). In the standard, an S-GW is selected when the terminal attaches to the network and P-GW is selected during the attach procedure and also when the UE requests a new PDN Connection. The selection process in SAE is roughly the following:
  1 Terminal attachment request
  2 eNodeB sends attachment request to MME
  3 MME receives attachment request—can infer subscriber identity as well as location (e.g. via eNodeB identity)
  4 MME authenticates subscriber using HSS/HLR
  5 HSS sends back name of default PDN context
  6 MME resorts to DNS to obtain the candidate list of GWs
  7 MME selects one of the GWs
The standard selection process can take into account goals like:
  selection of a combined GW (a GW which is Serving and PDN-GW as well),
  load sharing (e.g. in random or weighted random order)
  geographical considerations (if APN names are provisioned to have a geographical context as well) DNS-based selection under standardization in 3GPP.
  Topology
Neither of the existing solutions is prepared for movements of subscribers. This means that the selection mechanisms do not take into account the potential user mobility and the expected traffic volumes at different locations.

Hence they cannot utilise transport so efficiently for a user who is mobile. On the contrary, selecting a local GW for a highly moving user may even be worse than selecting a further away (more centrally placed) GW.

In another example, in a scenario with a city centre and a suburb where all people leave their home in the morning to go to work in the city centre there may be enormous strain on the Radio and Core networks due to tracking area update (TAU) signalling at specific times during the day. For instance, Tokyo has this problem when Shinkansen travel and arrives into the city.

This has been tried to be counteracted in the 3GPP standard with the use of TAI lists (TAI list is an aggregation of several TAs)
Problems:
  1) there is no clear picture on how to define the TAI lists.
  2) There are also problems if the subscriber keeps the potentially huge TAI list during paging procedures, the paging request will be sent to a very large area.
  3) If there is no defined end to the TAI list there will be a massive TAU storm when all the commuters arrive at the same time.

SUMMARY

It is therefore an object of the present invention to provide solutions for decreasing signaling load on wireless networks.

A solution according to the present invention relates to initially selecting a central GW for the mobile user.

Considering the mobility behaviour of users indicates that most individuals travel only over short distances, but a few regularly move over hundreds of kilometers. Besides these observations, commuters are probably the best example for subscribers who likely generate the most traffic at a quite different location than where they switched on their phones in the morning.

Selecting a distant GW for a mobile user in advance requires knowledge (or at least suspicion) that the user will likely move away a great distance.

In an even more intelligent case, if the GW selection process knew where exactly the user will likely generate the majority of its traffic, it could select a local GW close to that point—which, however, may again be some distance away from the terminal's location at attachment.

The objective of this invention is to enable such an intelligent GW selection process. This would be especially useful in 3GPP R8 and beyond where it is expected that operators would deploy a larger number of geographically distributed GWs.

This is provided in a number of aspects in which a first is an attachment method in a wireless communication network. The method comprises the steps of:

Receiving in a network node an attachment request relating to a user equipment.

Receiving in the network node subscriber identity information.

Determining in the network node at least one suitable attachment entity based on stored historical mobility patterns relating to the identified subscriber.

Communicating from the network node the determined at least one suitable attachment entity to at least one node in the network.

The attachment entity may be determined by selecting an entity where the subscriber has spent largest time at and/or where the subscriber has largest traffic volume.

The attachment entity may be a gateway, central or local.

The method may further comprise at step of determining a list with tracking areas to be associated with the user equipment and optionally further comprise a step of marking one tracking area in the list as a stop tracking area.

The historical mobility patterns may be stored in the network node or stored in a separate node communicatively connected to the network. At least one of geographical or logical location of the attachment entity may be stored in a database.

The step of determining suitable node may comprise using at least one of the geographical or logical location of the attachment entity.

The method may further comprise a step of receiving a candidate gateway list from a domain name server and further a step of comparing the received gateway list to the stored historical mobility pattern.

Another aspect of the present invention is provided, a node participating in attachment procedures in a wireless communication network, comprising
a processor unit;
a memory unit;
at least one communication interface;
wherein the processor is arranged to execute instructions sets, stored in the memory unit, and communicate on the communication interface, for:
receiving an attachment request relating to a user equipment, i.e. UE;
receiving subscriber identity information for the UE;
determining at least one suitable attachment entity based on stored historical mobility patterns relating to the identified subscriber;
communicating the determined at least one suitable attachment entity to at least one node in the network.

This invention relates primarily to 3G/SAE core networks and future releases of the mobile or FMC core networks. However, the core idea may be applicable to other communication networks.

With this solution the network may determine a suitable attachment point for the UE and thus better make use of the infrastructure network resources. Furthermore, it provides a possibility for operators of the infrastructure network to more flexible control how UEs attaches to the network and mobility issues may be handled effectively.

These and other aspects of the invention will be apparent from and elucidated with reference to the embodiments described hereinafter.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF PREFERRED EMBODIMENTS

Figure 1:
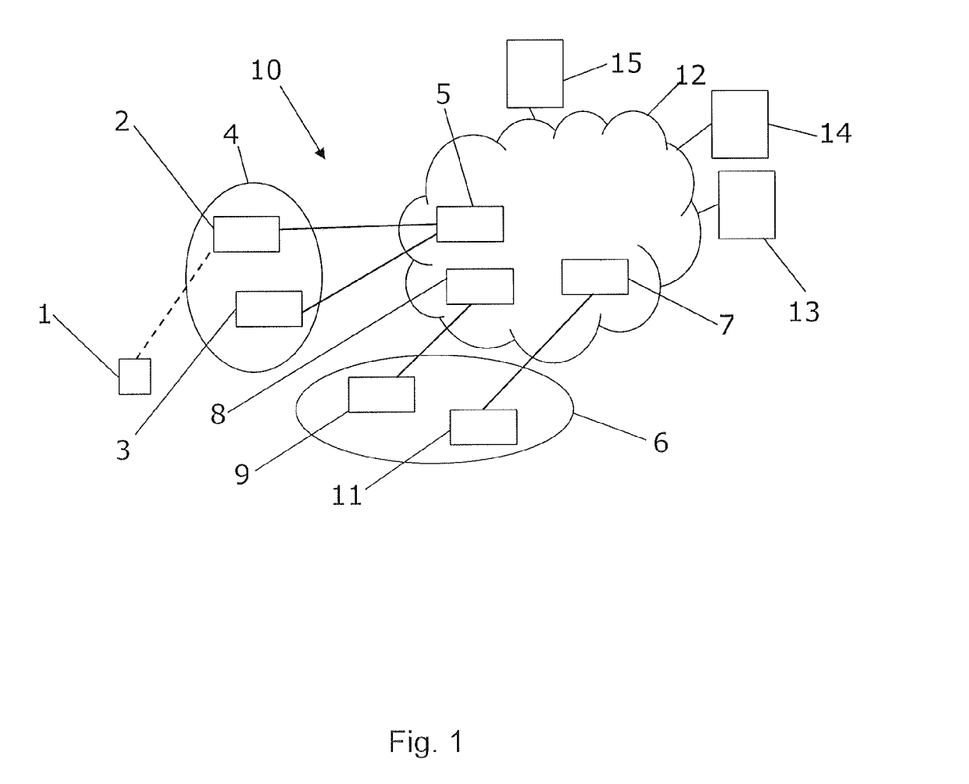
FIG. 1 illustrates schematically a network according to the present invention.

In FIG. 1, reference numeral 10 generally indicates a communication network according to the present invention. The network comprises a core network 12 for communicating between infrastructure devices for handling control signaling and data traffic. Depending on the specific configuration of the network different devices will be used. For illustrative purposes one embodiment of the network is shown. The network comprises a number of gateways, e.g. serving gateway 13 and local gateways 5, 7, and 8, and a mobility management entity 14 (MME). The core network is also connected to radio access nodes 2, 3, 9, 11 together forming one or several tracking areas 4 and 6. A user equipment 1 (UE) connect wirelessly to the network 10 via one radio access node. It should be noted that the present invention may find applicability even in a network configuration without local gateways, where the radio access nodes communicate with the serving gateway 13. The network may further comprise a Domain Name Server (DNS) 15.

To enable intelligent, mobility- and traffic-volume-aware gateway selection, a gateway selection process, which is initiated by a mobility management entity (MME), may execute data mining on previously collected historical data that is stored in a database, e.g. a mobility-traffic database (MTDB), and combine this knowledge with knowledge about the locations of operational gateways (GW) which is stored in a location database (LDB).

If a terminal/UE is attaching, connection to a new PDN from a location that is expected or at least may be considered "normal", e.g., the terminal has been there before many times or it is still in the same area where it has been before, an enhanced selection module according to the present invention tries to find a GW that best matches the subscriber's movements indicated in the historical data. If, however, the terminal is attaching from an "unexpected" location, e.g. from an area deviating from its normal activity areas, the selection process can follow a different policy pre-defined for unexpected locations, e.g. by selecting a more central GW from that geographical area.

Figure 3:
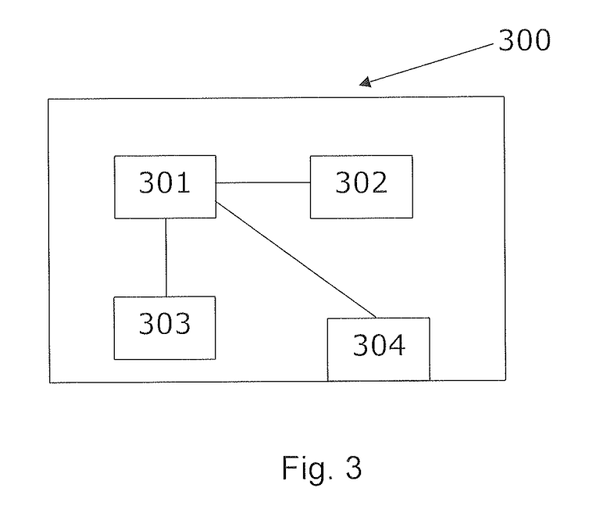
FIG. 3 illustrates schematically a device according to the present invention.

The GW selection process may be executed in any suitable node in the communication network and such a device 300 is illustrated in FIG. 3. The device comprises a processing unit 301, at least one memory unit 302, a communication interface 304, and optionally other components 303 as understood by the skilled person. The processing unit is arranged to execute computer program instruction sets stored in the memory unit for handling the gateway selection process and using the communication interface for receiving relevant information in the process and communicate a selected gateway.

Figure 4:
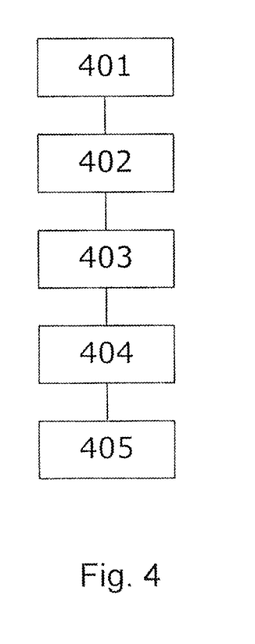
FIG. 4 illustrates schematically a method according to the present invention.

FIG. 4 illustrates a policy selection process for use in the present invention. A policy selecting device may for instance be the MME. In the MME the following steps may be executed:

401. receives an attachment request for a UE with subscriber identity information and access information and obtains subscriber history information, current UE location, and cell locations.

402. compares if UE location matches historic information.

403. determines selection policy.

404. obtains GW locations.

405. selects best matching GW based on determined selection policy and obtained GW locations.

As mentioned above, in one embodiment, the invention utilizes two databases: the MTDB and the LDB, which contain information used for selecting appropriate gateway.

Data may be stored in several different forms in the MTDB is, here are shown some examples for better understanding; however, these examples should not be construed as limiting to the invention but other forms, content, or structures may be used.

In one embodiment the MTDB may store for each user the amount of active time spent in a cell or tracking area, for example in a DB structure as shown in Table 1.

TABLE 1

| Subscriber (e.g. IMSI) | Cell ID | Active time From | To |
|---|---|---|---|
| 3873631 | 28710 | 2009-07-03 16:42:53 | 2009-07-03 16:59:25 |
| 3873631 | 28713 | 2009-07-03 16:59:25 | 2009-07-03 17:03:01 |
| 3873631 | 26505 | 2009-07-04 07:19:37 | 2009-07-04 09:19:37 |
| 3907613 | 08072 | 2009-07-01 07:14:36 | 2009-07-01 18:24:42 |

The entity performing the selection might directly access this detailed historical database or the MTDB may offer more compressed information, like the top 5 cells for each user; For example as shown in Table 2.

TABLE 2

| Subscriber (e.g. IMSI) | Top 5 cells Cell ID | % of active time spent there |
|---|---|---|
| 3873631 | 28361 | 32% |
|  | 28363 | 25% |
|  | 08420 | 18% |
|  | 12130 | 9% |
|  | 12131 | 5% |
| 3873632 | 01257 | 68% |
|  | 18976 | 20% |
|  | 05390 | 3% |
|  | 11000 | 2% |
|  | 29544 | 1% |

Active time might not be the most precise metric of user activity. For instance, a user may active in a cell for long without generating too much traffic. Since the operator may gain on reduced data transmissions, preferably, the MTDB possesses information about the amount of traffic generated by a customer in different locations, e.g. as shown in Table 3.

TABLE 3

| Subscriber (e.g. IMSI) | Cell ID | Active time From | To | Traffic Volume |
|---|---|---|---|---|
| 3873631 | 28710 | 2009-07-03 16:42:53 | 2009-07-03 16:59:25 | 150 MB |
| 3873631 | 28713 | 2009-07-03 16:59:25 | 2009-07-03 17:03:01 | 9 MB |
| 3873631 | 26505 | 2009-07-04 07:19:37 | 2009-07-04 09:19:37 | 12 MB |
| 3907613 | 08072 | 2009-07-01 07:14:36 | 2009-07-01 18:24:42 | 88 MB |

If not the total historical data, the summary in the form of the top x number of locations may be offered for the selection logic but this time, the order is determined by the generated traffic volume, e.g. as shown in Table 4.

TABLE 4

| Subscriber (e.g. IMSI) | Top 5 cells Cell ID | % of traffic generated there |
|---|---|---|
| 3873631 | 28361 | 32% |
|  | 28363 | 25% |
|  | 08420 | 18% |
|  | 12130 | 9% |
|  | 12131 | 5% |
| 3873632 | 01257 | 68% |
|  | 18976 | 20% |
|  | 05390 | 3% |
|  | 11000 | 2% |
|  | 29544 | 1% |

Alternatively, the MTDB may contain even finer granularity of information like for instance application types in use during communication, e.g. html documents, email communication, streaming media, voice and so on.

It should also be understood that combinations of these DB examples may be used.

Advantageously, the geographical and/or topological/logical locations of radio access nodes, e.g. base stations (cells), and GWs are known and stored in a suitable database, which may be called a location database, i.e. LDB. The purpose of this database is to help identify gateways close to or responsible for a given location, a given area, or a given cell. For instance, such a database may be available from the operator's management system. Alternatively, the LDB may be implemented as a naming convention, instead of a separate database. For example, the name of the geographical region may appear in both the cell's name and in the name of the GWs. For instance, there might be several cells named like cell1876.stockholm-central.operator.se and cell 1888.stockholm-central.operator.se. If the GWs are named e.g. as gw1.stockholm-central.operator.se then a match from a cell to a GW may be performed.

A more complex LDB may map each cell and each GW for example to GPS coordinates. In this case it is possible to determine geographical distances, which may be used for selecting appropriate GW.

In another embodiment, the LDB may be a topology map, where it is possible to determine the transport distance in terms of hops and/or administrative costs between cells (user locations) and GWs.

Figure 5:
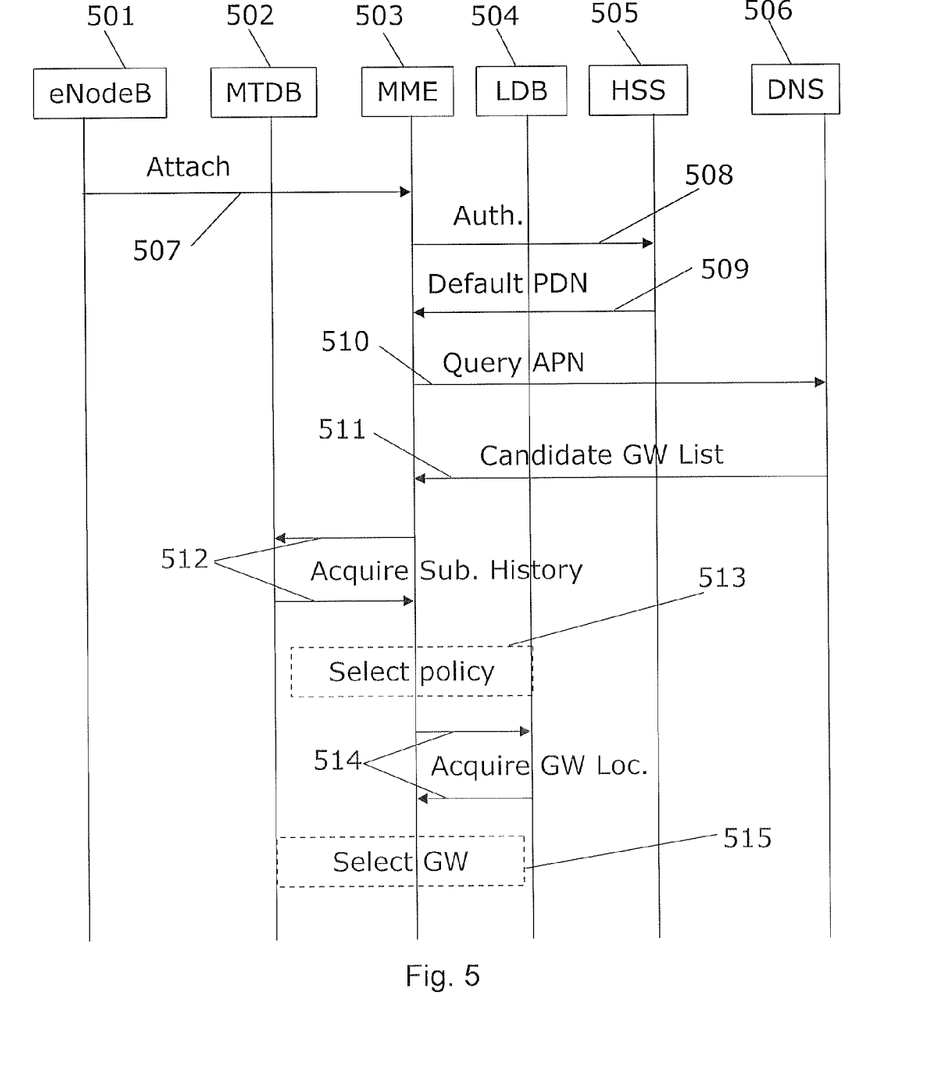
FIG. 5 illustrates schematically a signaling method according to the present invention.

The MME, being an element of the GW selection process in SAE, is advantageously used to implement the mobility-aware selection functionality. As described earlier, the MME obtains a list of potential GWs, so called candidates, that serve the required APN and which have the specified interfaces (GTP or PMIP). From the candidate list of GWs, the MME selects the GW to be used for the newly attaching terminal. As a parameter in the selection process, the MME uses the MTDB and/or LDB for determining suitable gateway. This selection process in the MME is shown in FIG. 5 together with other attachment steps. It should be appreciated that FIG. 5 shows only an exemplary list of steps during attachment. The following entities are involved in this example: a radio access node, e.g. an eNodeB 501, the MTDB 502, the MME 503, the LOB 504, a Home Subscriber Server (HSS) 505, and a Domain Name Server (DNS) 506.

507. The eNodeB sends an attachment message with information relating to APN, Cell-ID, and IMSI to the MME.

508. The MME sends an authentication message to the HSS.

509. The HSS responds with a default Packet Data Network name.

510. The MME sends a query message to the DNS using for instance APN and information relating to communication protocol.

511. The DNS sends a list of candidate gateways back to the MME.

512. The MME acquires subscriber history from the MTDB.

513. The MME selects appropriate policy as discussed in relation to FIG. 4.

514. The MME acquires locations of the gateways from the LDB.

515. The MME selects best matching gateway based n the selected policy.

In another embodiment, the core part of the selection logic functionality may reside in an enhanced DNS server. The DNS system may be arranged in such a way that requests for GWs are routed to this enhanced DNS server capable of performing the selection. The selection may still be using a selection policy function as described earlier.

With this solution, during GW selection the "Requestor" is the MME and the DNS request corresponds to the one with which the MME obtains the candidate list. A clear enhancement is that the terminal identity is also passed to the DNS, which is not done in the standard mechanism. The terminal ID can be passed e.g. as part of the queried name.

In the gateway selection process not only the terminal needs to be identified but the location of the terminal. For instance, the location may be identified by the cell ID. The MME, the requestor, knows the cell ID because in the 3GPP mechanism the cell ID is passed to the MME at attachment. Consequently, the requestor MME advantageously also specifies the location information in the DNS request—similarly how it adds the terminal info. The topology DB is suitable as an LDB if topological closeness is the selection criteria. Note however that the topology DB may also advantageously contain the base stations and the RAN backhaul topology, not only the core network, to be able to determine GW closeness in case if no naming convention is used as discussed earlier in this document. Also, the topology database may also contain information about the geographical location or area of the different nodes.

Now a few examples of selection policies will be shown; however, it should be noted that they are only exemplary and do not limit the invention.

Different algorithms may be used to determine if a new attach request is coming from an expected location or from an unexpected location. The feasibility of algorithms also depends on what information is available in the MTDB.

Examples when a new attachment location may be considered unexpected:
Attachment from a cell/region where the subscriber has never been before.
Attachment from a cell/region where the subscriber has never been before and it is at least some distance away from the previously covered area. The distance may be pre-defined, location dependent, or dependent on the subscriber's mobility history.

Examples of normal location policies:
If there are locations in the subscriber's history where it clearly spends the most time or generates the most traffic, then the selection logic can try to select a GW which best suits these "top" locations:
If the locations are close to each other, select a GW from that geographical or topological region
If the top locations are far away from each other
try to select a central GW in between, or
select a GW near the top location which is closer to the subscriber's current location (and hope that it will re-attach if it goes to the other location)
If the subscriber's movements indicate no clear top locations, try to select a central GW from a larger area of the terminal's current location Example of unexpected location policy
Select a more central GW from that new geographical area The disclosed solution enables the implementation of an intelligent GW selection process that is capable of assigning a GW even for mobile users. This allows more efficient transport utilisation between the user terminal and the GW even if the user is moving. This way, transport costs may be reduced.

The present invention may be easily distributed to existing communication architecture by installing suitable software code.

Knowing subscribers historical mobility patterns, may give operators of networks a possibility to reduce control signalling for travelling subscribers.

The MME may have an operator friendly configuration where the operator can define own sets of Tracking Area Identifier (TAI) lists and also be able to define a "stop TA" as part of the TAI list.

The defining of the "stop TA" will make it possible for the MME to detect this in a periodic TAU procedure and use it as a trigger to initiate a Globally Unique Temporary UE Identity (GUTI) Re-allocation procedure. The GUTI re-allocation procedure will assign a new TAI list to the UE. The use of stop TA helps to minimize possible paging storms.

In the following a possible scenario for this situation is shown. A lot of subscribers move from "Suburb" to "City Centre" every morning. This is exemplified in FIG. 2: in one end the subscriber starts in a suburb area 208 connected to a first Tracking Area (TA) TA1 201. In travelling 209 to the city centre 207, the subscriber may pass several TAs: TA2 202, TA3 203, TA4 204, TA5 205, and TA6 206 before arriving in the city centre 207 with its own TAI list (not shown). One of the TAs may be seen as a main travelling area, and will be referred to as Rail/highway TA 204. If this travelling scenario is handled without any coordinated TAI lists this will possibly cause a lot of Tracking Area Update (TAU) procedures; however, if the TAI list is configured to cover the "Rail/Highway" then you would eliminate the need for all that signalling.

If the operator is given the option to configure TAI Lists it may result in the following exemplary definition as seen in Table 5:

TABLE 5

| Name of TAI list | TAs included in the list | TA Stop | TA list to handover to |
|---|---|---|---|
| Highway1 | TA1, TA2, TA3, TA4, TA5, TA6 | TA5 | Centre |
| Centre | TA8, TA9, TA10 | TA10 | Highway1 |

This is an example where the TAI lists are defined and given names "Highway1" and "Centre". With this setup there is no need for the UE to signal anything else then a Periodic TAU (to confirm location) during the trip into the city centre.

Figure 2:
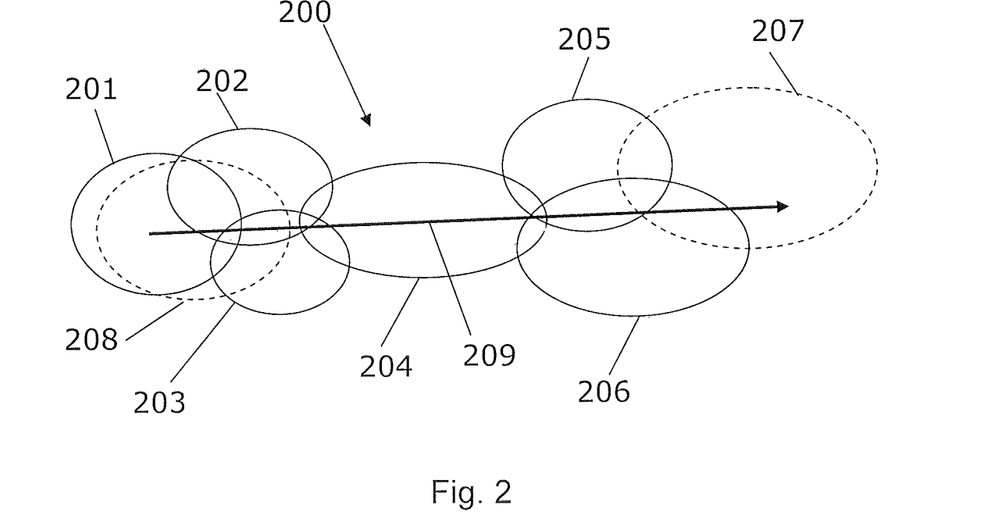
FIG. 2 illustrates schematically a mobility scenario according to the present invention.

When the UE reaches TA5 205 which in this exemplary case is defined as a STOP TA, indicated in the Periodic TAU, then a standalone GUTI RE-allocation procedure is triggered in order to inform the UE that it from now on has a new smaller TAI List: Centre. The reason for this is to minimize the signalling load on the system caused by paging. Paging means that the MME tries to find the UE in every TA contained in the TAI list, the smaller the list is the less signalling load.

There is also a possibility that this information list may be built up in the MME on a per UE level (without configuration) meaning that each UE has its own traffic pattern in order to minimize the signalling load. The MME may collect and store the data needed to heuristically build this table, which may be located in the MME or stored elsewhere, e.g. in the MTDB.

The name of the TAI list can also be used to select S-GW.

It will give operator more freedom to configure TAI Lists for specific traffic scenarios, which will result in a better and efficient network minimize the signalling load.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

| | |
|---|---|
| DNS | Domain Name Server |
| GUTI | Globally Unique Temporary UE Identity |
| GW | Gateway |
| HSS | Home Subscriber Server |
| IMSI | International Mobile Subscriber Identity |
| LDB | Location Database |
| MME | Mobility Management Entity |
| MTDB | Mobility Traffic Database |
| PDN | Packet Data Network |
| SAE | System Architecture Evolution |
| TA | Tracking Area |
| TAI | TA Identifier |
| TAU | Tracking Area Update |

The invention claimed is:

1. An attachment method in a wireless communication network, comprising the steps of:
   receiving in a network node an attachment request relating to a user equipment;
   receiving in the network node subscriber identity information;
   determining in the network node at least one suitable attachment entity based on stored historical mobility patterns relating to the identified subscriber, wherein the attachment entity is determined by selecting an entity where the subscriber has spent largest time at and where the subscriber has largest traffic volume; and
   communicating from the network node the determined at least one suitable attachment entity to at least one node in the network.

2. The method according to claim 1, wherein the attachment entity is a gateway.

3. The method according to claim 2, wherein the gateway is a local gateway.

4. The method according to claim 1, further comprising determining a list with tracking areas to be associated with the user equipment.

5. The method according to claim 4, further comprising a step of marking one tracking area in the list as a stop tracking area.

6. The method according to claim 1, wherein the historical mobility patterns are stored in the network node.

7. The method according to claim 1, wherein the historical mobility patterns are stored in a separate node communicatively connected to the network.

8. The method according to claim 1, wherein at least one of geographical or logical location of the attachment entity is stored in a database.

9. The method according to claim 8, wherein the step of determining suitable node comprises using at least one of the geographical or logical location of the attachment entity.

10. The method according to claim 1, further comprising a step of receiving a candidate gateway list from a domain name server.

11. The method according to claim 10, further comprising a step of comparing the received gateway list to the stored historical mobility pattern.

12. A node participating in attachment procedures in a wireless communication network, comprising:
   a processor unit;
   a memory unit;
   at least one communication interface;
   wherein the processor is arranged to execute instructions sets, stored in the memory unit, and communicate on the communication interface, for:
   receiving an attachment request relating to a user equipment (UE);
   receiving subscriber identity information for the UE;
   determining at least one suitable attachment entity based on stored historical mobility patterns relating to the identified subscriber, wherein the attachment entity is determined by selecting an entity where the subscriber has spent largest time at and where the subscriber has largest traffic volume; and communicating the determined at least one suitable attachment entity to at least one node in the network.

* * * * *